United States Patent
Eriksson

(10) Patent No.: US 7,789,370 B2
(45) Date of Patent: Sep. 7, 2010

(54) ACTUATOR SYSTEM

(75) Inventor: Klas Eriksson, Asker (NO)

(73) Assignee: Vetco Gray Scandanavia AS, Sandvika (NO)

( * ) Notice: Subject to any disclaimer, the term of this patent is extended or adjusted under 35 U.S.C. 154(b) by 671 days.

(21) Appl. No.: 11/587,307

(22) PCT Filed: Apr. 25, 2005

(86) PCT No.: PCT/IB2005/001102

§ 371 (c)(1),
(2), (4) Date: Sep. 5, 2007

(87) PCT Pub. No.: WO2005/103540

PCT Pub. Date: Nov. 3, 2005

(65) Prior Publication Data

US 2008/0142748 A1 Jun. 19, 2008

Related U.S. Application Data

(60) Provisional application No. 60/564,618, filed on Apr. 23, 2004.

(51) Int. Cl.
*F16K 31/04* (2006.01)
(52) U.S. Cl. ............................ 251/71; 251/129.11
(58) Field of Classification Search .............. 251/71, 251/129.11, 129.12, 129.13; 60/404, 413, 60/716; 185/40 R, 40 B
See application file for complete search history.

(56) References Cited

U.S. PATENT DOCUMENTS

| | | | | |
|---|---|---|---|---|
| 3,808,895 A | * | 5/1974 | Fitzwater | 251/71 |
| 4,114,465 A | * | 9/1978 | Troy | 251/129.11 |
| 4,741,508 A | * | 5/1988 | Fukamachi | 251/71 |
| 4,757,684 A | * | 7/1988 | Wright | 251/71 |
| 5,182,498 A | * | 1/1993 | Stuhr | 251/129.11 |
| 6,431,317 B1 | * | 8/2002 | Coe | 251/69 |
| 6,595,487 B2 | | 7/2003 | Johansen et al. | |
| 6,995,529 B2 | * | 2/2006 | Sibley | 318/161 |
| 2003/0145667 A1 | | 8/2003 | Donald et al. | |

FOREIGN PATENT DOCUMENTS

| | | |
|---|---|---|
| DE | 19811073 A1 | 9/1999 |
| DE | 10134428 A1 | 1/2003 |
| EP | 1333207 A2 | 8/2003 |
| GB | 2198766 A | 6/1988 |

OTHER PUBLICATIONS

PCT/ISA/210—International Search Report—Sep. 22, 2005.

* cited by examiner

*Primary Examiner*—John Bastianelli
(74) *Attorney, Agent, or Firm*—Venable LLP; Eric J. Franklin

(57) ABSTRACT

An actuator system including a shaft, elements arranged to power the shaft and at least one actuated member actuated by the elements arranged to power the shaft. The elements arranged to power the shaft include a plurality of transverse flux motors.

19 Claims, 3 Drawing Sheets

ACTUATOR SYSTEM

CROSS-REFERENCE TO RELATED APPLICATIONS

This application claims priority to U.S. provisional patent application 60/564,618 filed Apr. 23, 2004 and is the national phase under 35 U.S.C. §371 of PCT/IB2005/001102 filed Apr. 25, 2005.

FIELD OF THE INVENTION

The present invention relates to an actuator system, comprising a shaft, a means arranged to power the shaft, and at least one actuated member actuated by the means to power the shaft.

The invention also relates to a method for actuating an actuated member by means of a shaft and a means for powering the shaft.

Generally, actuation systems according to the invention are to be utilized to actuate elements such as valves in a variety of contexts. One particular context is in subsea and topside oil and gas installations. In these contexts, actuators may be utilized to operate valves linearly, rotary or otherwise. The present invention could be used in any context where an electrical actuation system is utilized. Other examples can include the chemical industry, pulp and paper industry and sewage treatment plants.

The term spring means, as used herein, should be regarded in a wide sense. It might include mechanical, pneumatic as well as hydraulic springs. However, in most cases, a mechanical spring is conceived.

BACKGROUND OF THE INVENTION AND PRIOR ART

Particularly in the context of installations handling oil and gas, there is typically a need to quickly actuate valves. This is at least in part due to the nature of the material being handled in the installations. Along these lines, there is a need to maintain control over the flow of oil, gas or other materials that could potentially escape from the installations and thereby prevent any possible environmental damage. The desire to control movement of material in such installations may also manifest itself in a desire for redundancy of control mechanisms as well as fail-safe mechanisms.

Typically, known electrical actuators used for actuating valves in subsea oil and gas recovery systems are slow, with a delay time interval of about thirty seconds. Thereby, conventional electric motors are used for the purpose of driving a shaft that, in its turn, actuates a valve or the like. In certain situations, for example emergency situations, a more rapid action would be desirable.

OBJECTS OF THE INVENTION

It is an object of the present invention to present an actuator system that is well adapted for the purpose of actuating members such as valves, both rapidly and with a certain degree of redundancy.

SUMMARY OF THE INVENTION

The object of the invention is achieved by means of the actuator system as initially defined, characterized in that said means arranged to power the shaft comprises a plurality of transverse flux motors. Including a plurality of motors can provide the invention with a degree of redundancy. The transversal flux motor is "pancake" shaped, thereby requiring less space in the longitudinal direction of the shaft. Typically, transversal flux motors rotates slowly, has a large torque and low "rotational inertia". According to preferred embodiments, such a motor may have a rotation speed below about 5 rpm, with a torque on the order of about 20 Nm. Acceleration time from idle to full speed may be on the order of about 0.1 seconds. This can permit the motor to accelerate from a standstill to full speed very fast. Also, if the motor hits an end stop at full speed, the impact is much smaller than for a high speed motor. Thus, the use of transverse flux motors will guarantee a rapid action of the actuator system.

Powering the shaft, as referred to herein, will mean to rotate the shaft, by means of a motor.

According to a preferred embodiment the system comprises three successively arranged motors.

Actuator systems should also provide a fail-safe function, guaranteeing a return of an actuated member, such as a valve, to a preset position in the event of a power failure or some other problem. For example, a cut cable could interrupt a flow of power to an electric motor of an actuator system. Typically, in the context of a valve, the valve should then be returned to a closed position or to an open position in a fail-safe mode. Therefore, according to a preferred embodiment of the invention, the actuator system comprises at least one spring operative to return the system to a preset position upon power failure.

According to one embodiment the at least one spring comprises a spiral spring. Such springs are particularly useful both for rotary output, such as a ball valve, and for a linear output, such as for a globe valve.

According to an alternative solution, the system comprises a plurality of spiral springs operative to return the system to a preset position upon power failure.

According to another embodiment, the at least one spring comprises a linear spring. Linear springs, such as "Bellevue Washers", which is described in published European patent application 1 333 207, provide a lot of power in a small volume. Typically, such a spring is used for actuators with a linear output. If the actuator system produces a linear output actuator, then a "linear" type spring may be used for the fail-safe action.

Preferably, the actuator system comprises a plurality of motors and a plurality of springs, said springs being arranged alternatingly, in an interleaving arrangement, with regard to the motors. In such cases spiral springs are often preferred, since they are well suited for the purpose of being interleaved between individual motors along a shaft. The number of springs may be less than the number of motors. According to a preferred embodiment the system comprises three motors and two springs, arranged alternatingly along a common shaft.

Furthermore, the system may comprise a rotary-to-linear converter operative to convert rotary motion of the shaft to linear output, to provide an optional linear output. It may also comprise a planetary gearing arranged between the motors and the rotary-to-linear converter, to compensate for differences in speed between the motor and the requirements of the rotary-to-linear converter. Accordingly, depending on the provision of a rotary-to-linear converter, the system will present a rotary output or a linear output. In case of a linear output, a linear return spring can, and most probably, will be used.

A control unit may be included in the actuator system to coordinate the motors. For instance, the control unit may help to ensure that the motors rotate in the same direction and with the same speed.

The motors, springs and other elements of an actuator system according to the present invention may, preferably, be housed in a waterproof housing, preferably filled with oil.

The object of the invention is also achieved by means of the method initially defined, characterized in that it comprises the step of operating a plurality of transverse flux motors to power said shaft in order to drive the actuated member in a desired manner.

Preferably, the method also comprises the step of actuating the actuated member to a preset position with at least one spring member upon power failure.

As referred to above, the present invention is particularly useful in subsea environments. Some particular applications that the present invention may be utilized within this context can include for fast control valves for, for example, gas/liquid separator control, compressor antisurge control, and pump minimum flow control. Fast control valves may also be employed in, for example pressure regulation, level regulation, speed regulation, antisurge regulation, minimum flow regulation, and flow regulation. These represent a few examples where the present invention may, preferably, be utilized.

Further features and advantages of the present invention will be disclosed in the following detailed description as well as in the annexed patent claims.

BRIEF DESCRIPTION OF THE DRAWINGS

Objects and advantages of the present invention will be more clearly understood from the following specification when considered in conjunction with the accompanying drawings, in which.

DETAILED DESCRIPTION OF THE INVENTION

Figure 1:
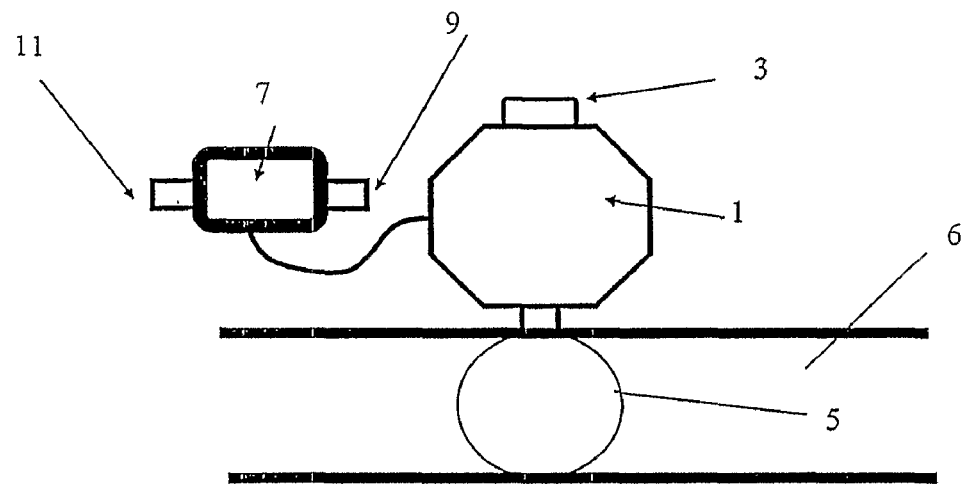
FIG. 1 shows an embodiment of an actuator according to the present invention.

FIG. 1 illustrates one embodiment of an actuator system according to the present invention. The embodiment shown in FIG. 1 includes an oil-filled, pressure compensated motor compartment 1 that houses the motors and springs, among other elements. The motor compartment includes a remotely operated vehicle (ROV) interface 3. This embodiment of an actuator according to the present invention drives a ball or globe valve 5 arranged in a conduit 6. An electronic capsule 7 is connected to the motor compartment through 220 V power interface 9. According to this embodiment, the electronic capsule also includes a PROFIBUS DP interface 11 operative to receive position commands from a supervisory control system and to report status information back to the supervisory control system. PROFIBUS DP is a known instrumentation field bus. Other, corresponding interfaces may alternatively be utilized.

Figure 2:
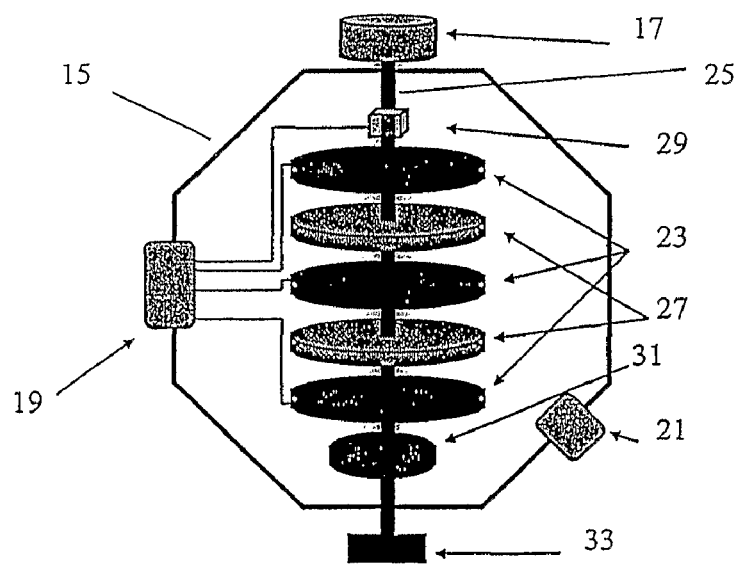
FIG. 2 shows a second embodiment of an actuator according to the present invention.

FIG. 2 illustrates an embodiment of a rotary configuration actuator system according to the present invention. This embodiment includes an oil filled motor compartment/housing or capsule 15. The motor capsule includes a remotely operated vehicle (ROV) interface 17 and a remotely operated vehicle (ROV) connector 19. A pressure compensator 21 may be arranged in an opening in a wall of the motor capsule to address pressure differences between the interior of the motor capsule and the exterior environment. Three independent motors 23 are arranged on a common shaft 25. Two independent clock springs 27 are alternatingly arranged with the motors 23. A position sensor 29 is included to sense the rotational position of the shaft. A planetary gear 31 is connected to the shaft. This embodiment includes an interface to ¼ turn valve 33.

Figure 3:
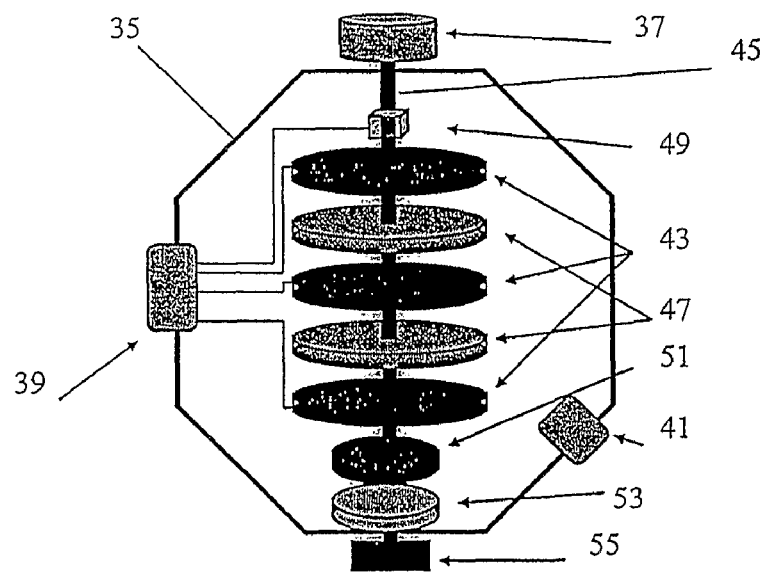
FIG. 3 shows a third embodiment of an actuator according to the present invention.

FIG. 3 illustrates an embodiment of a linear configuration actuator system according to the present invention. This embodiment includes an oil filled motor capsule 35. The motor capsule includes a remotely operated vehicle interface 37 and a remotely operated vehicle connector 39. A pressure compensator 41 is arranged in an opening in a wall of the motor capsule to address pressure differences between the interior of the motor capsule and the exterior environment. Three independent motors 43 are arranged on a common shaft 45. Two independent clock springs 47 are alternatingly arranged with the motors. A position sensor 49 is included to sense the rotational position of the shaft. A planetary gear 51 is connected to the shaft. A rotary/linear converter 53 is operatively connected to the shaft to convert rotary motion produced by the motors to linear motion. This embodiment includes an interface to a linear acting valve 55.

Figure 4:
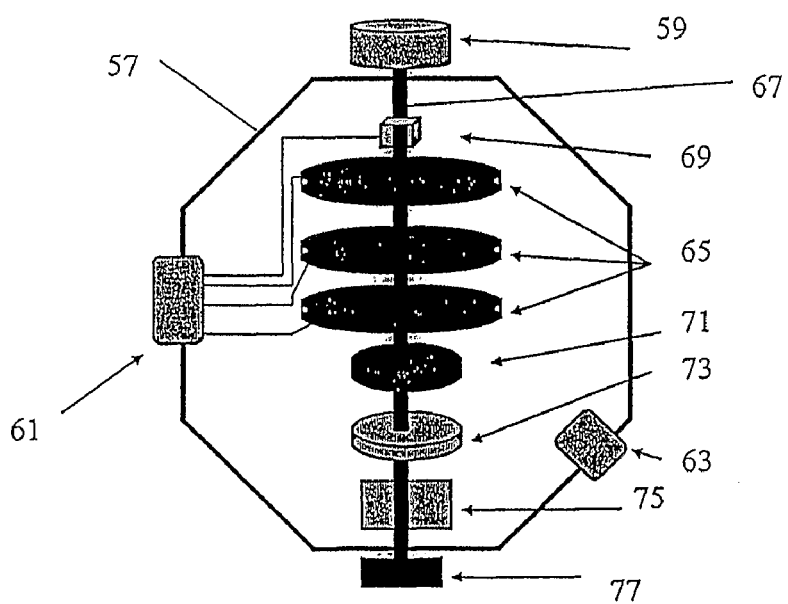
FIG. 4 shows a fourth embodiment of an actuator according to the present invention.

FIG. 4 illustrates an embodiment of another linear configuration actuator system according to the present invention. This embodiment includes an oil filled motor capsule 57. The motor capsule includes a remotely operated vehicle interface 59 and a remotely operated vehicle connector 61. A pressure compensator 63 is arranged in an opening in a wall of the motor capsule to address pressure differences between the interior of the motor capsule and the exterior environment. Three independent motors 65 are arranged on a common shaft 67. A position sensor 69 is included to sense the rotational position of the shaft. A planetary gear 71 is connected to the shaft. A rotary/linear converter 73 is operatively connected to the shaft to convert rotary motion produced by the motors to linear motion. Such a converter may include a threaded shaft and nut arrangement (see EP 1 333 207). A linear spring and latch 75 is arranged on the shaft. This embodiment includes an interface to linear acting valve 77.

As to the function of the linear spring and latch 77, it is preferred to be in accordance with what is disclosed in European patent application EP 1 333 207, the content of which is included herein by reference. More precisely, the rotary/linear converter 73, that produces a linear motion, includes torque reaction means (not shown) which, in normal operation, is in an activated condition and provides a torque reaction path to enable the driven member to be reversibly moved between a first and a second position, the driven member being restrained from rotating, but which, in the event of a fault, is in a deactivated condition so that it no longer provides said torque reaction path and the spring 75 can move the driven member to said first position without disengaging the rotary motion means, i.e. the shaft. As a result the fail safe mechanism does not have to reversely drive the actuator through its relatively complicated mechanism, which includes the motor or motors, the gearbox, and the rotary/linear converter. Any jamming in such parts will, accordingly, not inhibit the operation of the fail-safe mechanism.

Figure 5:
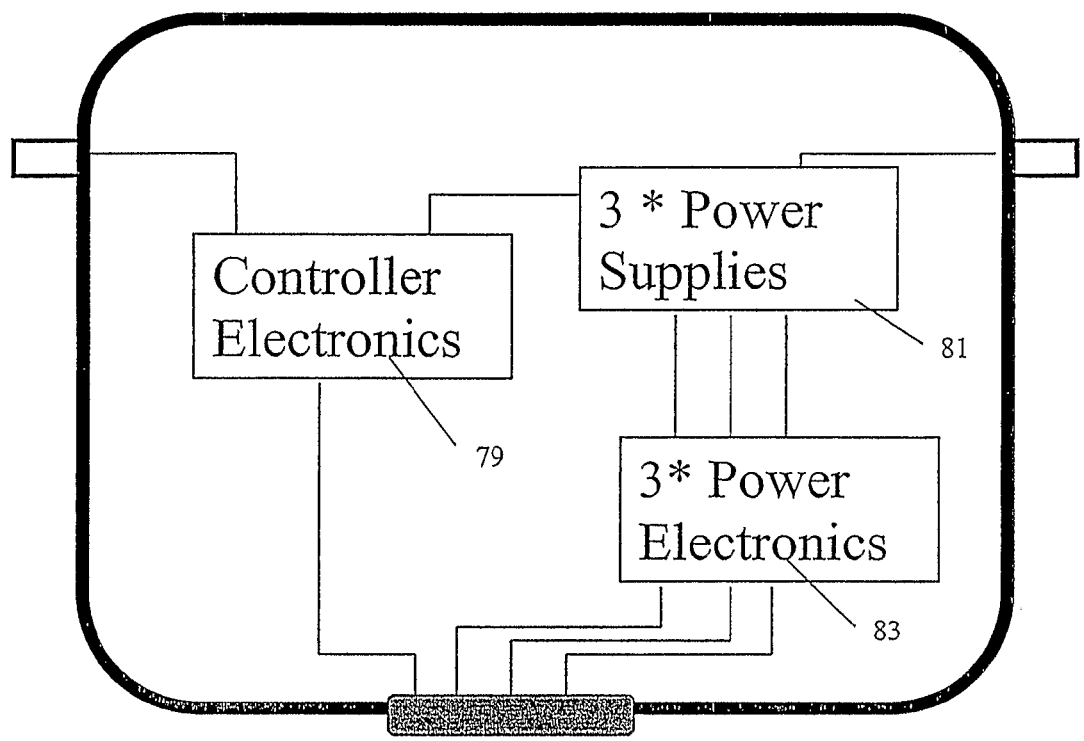
FIG. 5 shows an embodiment of a control unit according to the present invention.

FIG. 5 illustrates an embodiment of a control unit according to the present invention. This embodiment of a control unit includes controller electronics 79, three power supplies 81, and three power electronics 83.

Typically, an actuator system according to the present invention includes a plurality of transvers flux motors. Two, three or more motors may be utilized. One embodiment includes six of such motors. The motors may be arranged stacked along a common shaft. However any arrangement, particularly those that permit the additional motors to provide redundant power may be utilized.

The present invention can also include power electronics and power supplies operatively connected to the motors. The actuator system may also include a number of electronics and power supplies to provide a degree of redundancy. Along these lines, some embodiments of the invention may include one power electronics and one power supply per motor. According to one example, if four motors are required to provide power to the system, the system could include six motors such that two may fail and still permit the system to operate at full performance.

The present invention may also include a fail-safe system. The fail-safe system may include one or more spring members operative to return the valve or other member being actuated to a preset or safe position. In the case of a valve, the fail-safe or preset position typically is the closed position, but may also be the open position.

It should be realised that the invention has been shown by way of example by means of the above described embodiments. A number of alternative embodiments will therefore be obvious for a person skilled in the art without going beyond the scope of the invention as described herein and illustrated in the annexed drawings.

The invention claimed is:

1. An oil and gas installation, comprising:
   an actuator system comprising a shaft and means to power the shaft, the means to power the shaft comprising a plurality of transverse flux motors, and a plurality of springs, wherein the springs are alternatingly interleavingly arranged with respect to the motors and are operative to return the system to a preset position upon a power failure; and
   an actuated member actuated by the means to power the shaft.

2. The installation according to claim 1, wherein the actuated member comprises a valve.

3. The installation according to claim 1, wherein the system comprises three successively arranged motors.

4. The installation according to claim 1, wherein the springs comprise spiral springs.

5. The installation according to claim 1, wherein the springs comprise linear springs.

6. The installation according to claim 1, further comprising:
   a rotary-to-linear converter operative to convert rotary motion of the shaft to linear output.

7. The installation according to claim 6, further comprising:
   a planetary gearing arranged between the motors and the rotary-to-linear converter.

8. The oil and gas recovery installation according to claim 1, further comprising:
   a control unit operative to control operation of the actuator system.

9. The installation according to claim 1, further comprising:
   a compartment housing the motors and the springs.

10. The installation according to claim 9, wherein the compartment is oil filled.

11. The installation according to claim 9, further comprising:
    at least one remotely operated vehicle interface; and
    at least one remotely operated vehicle connector.

12. The installation according to claim 11, wherein the at least one remotely operated vehicle interface and the at least one remotely operated vehicle connector are arranged on the compartment.

13. The installation according to claim 9, the compartment comprises a pressure compensator.

14. The installation according to claim 1, further comprising:
    an interface operatively connected to the shaft and the actuated member.

15. The installation according to claim 1, further comprising:
    a position sensor operative to determine a position of the shaft.

16. The installation according to claim 15, wherein when the actuator is in a preset position the valve is closed.

17. The oil and gas recovery installation according to claim 15, wherein when the actuator is in a preset position the valve is open.

18. A method for actuating an actuated member in an oil and gas installation, the method comprising:
    operating a plurality of transverse flux motors and a plurality of return springs, wherein the springs are alternatingly interleavingly arranged with respect to the motors to power a shaft in order to drive the actuated member and are operative to return the system to a preset position upon a power failure.

19. The method according to claim 18, wherein the actuated member comprises a valve.

* * * * *

UNITED STATES PATENT AND TRADEMARK OFFICE
CERTIFICATE OF CORRECTION

PATENT NO. : 7,789,370 B2
APPLICATION NO. : 11/587307
DATED : September 7, 2010
INVENTOR(S) : Klas Eriksson Page 1 of 1

It is certified that error appears in the above-identified patent and that said Letters Patent is hereby corrected as shown below:

On the Title page Item (73) Assignee: "Vetco Gray Scandanavia AS" should read

"Vetco Gray Scandinavia AS"

Signed and Sealed this

Thirtieth Day of November, 2010

David J. Kappos
*Director of the United States Patent and Trademark Office*